(12) United States Patent
Gauderis (10) Patent No.: US 11,520,988 B2
(45) Date of Patent: Dec. 6, 2022

(54) SEMANTIC CLASSIFICATION OF ENTITIES IN A BUILDING INFORMATION MODEL BASED ON GEOMETRY AND NEIGHBORHOOD

(71) Applicant: Bricsys NV, Ghent (BE)

(72) Inventor: Tjerk Gauderis, Ghent (BE)

(73) Assignee: BRICSYS NV, Ghent (BE)

(*) Notice: Subject to any disclaimer, the term of this patent is extended or adjusted under 35 U.S.C. 154(b) by 620 days.

(21) Appl. No.: 16/128,696

(22) Filed: Sep. 12, 2018

(65) Prior Publication Data
US 2020/0081979 A1 Mar. 12, 2020

(30) Foreign Application Priority Data

Sep. 12, 2017 (EP) .................................. 17190705

(51) Int. Cl.
*G06F 16/40* (2019.01)
*G06F 40/205* (2020.01)
*G06F 40/30* (2020.01)
*G06F 16/28* (2019.01)
*G06N 20/00* (2019.01)
*G06F 30/13* (2020.01)
*G06N 7/00* (2006.01)

(52) U.S. Cl.
CPC ............ *G06F 40/30* (2020.01); *G06F 16/285* (2019.01); *G06F 30/13* (2020.01); *G06N 7/005* (2013.01); *G06N 20/00* (2019.01)

(58) Field of Classification Search
CPC ...... G06N 3/0454; G06N 20/10; G06N 3/082; G06N 7/005; G06N 20/00; G06F 40/30; G06F 16/285; G06F 30/13; G06F 2111/08; G06F 2111/20; G06K 9/00
USPC .............................................. 706/15
See application file for complete search history.

(56) References Cited

U.S. PATENT DOCUMENTS

| 8,694,292 B2 * | 4/2014 | Peterman ............... G06F 30/20 703/2 |
| 2009/0319454 A1 | 12/2009 | Regli |

(Continued)

OTHER PUBLICATIONS

Automated Classification of Heritage Buildings for As-Built BIM Using Machine Learning Techniques (Year: 2017).*

(Continued)

*Primary Examiner* — Brandon S Cole
(74) *Attorney, Agent, or Firm* — Maschoff Brennan (57) ABSTRACT

The current invention concerns a computer-implemented method, a computer system, and a computer program product for the semantic classification of an entity in a building information model (BIM). The BIM comprises multiple target entities. Update data is obtained. For each target entity, geometric information about the target entity is obtained from the BIM. For each target entity, an initial probability distribution of semantic classification is determined based on the obtained geometric information about the target entity. Relative geometric information about the target entities is obtained from the BIM. For each target entity, an updated probability distribution of semantic classification is determined based on the obtained relative geometric information, the initial probability distributions of all target entities, and the update data. For each target entity, a semantic classification is selected based on the updated probability distribution of the target entity.

19 Claims, 3 Drawing Sheets

(56) References Cited

U.S. PATENT DOCUMENTS

| | | | | |
|---|---|---|---|---|
| 2010/0100546 A1* | 4/2010 | Kohler | .................... | G06F 16/40 |
| | | | | 707/739 |
| 2013/0257850 A1* | 10/2013 | Chen | ....................... | G06T 19/20 |
| | | | | 345/522 |
| 2015/0006117 A1* | 1/2015 | Zhang | .................... | G06V 20/64 |
| | | | | 703/2 |
| 2015/0170526 A1* | 6/2015 | Wang | ..................... | G06V 20/13 |
| | | | | 701/16 |
| 2017/0061326 A1 | 3/2017 | Talathi | | |
| 2017/0277951 A1* | 9/2017 | Wagner | ................ | G03B 15/006 |
| 2019/0291728 A1* | 9/2019 | Shalev-Shwartz | ........................... | |
| | | | | B60W 30/18154 |
| 2020/0057824 A1* | 2/2020 | Yeh | .......................... | G06N 3/04 |
| 2020/0110809 A1* | 4/2020 | DeFelice | .............. | G06N 3/0472 |
| 2021/0081613 A1* | 3/2021 | Begun | .................. | G06N 3/0454 |

OTHER PUBLICATIONS

Belsky et al.; "Semantic Enrichment for Building Information Modeling"; Computer-Aided Civil and Infrastructure Engineering, DOI: 0.1111/mice.12128, 2016.

Friedman et al.; "Greedy Function Approximation: A Gradient Boosting Machine", 1999 Reitz Lecture, The Annals of Statistics, 2001, vol. 29, No. 5, pp. 1189-1232.

Mason et al.; "Boosting Algorithms as Gradient Descent", http://papers.nips.cc/paper/1766-boosting-algorithms-as-gradient-descent.pdf.

\* cited by examiner

SEMANTIC CLASSIFICATION OF ENTITIES IN A BUILDING INFORMATION MODEL BASED ON GEOMETRY AND NEIGHBORHOOD

This application claims the benefit of European Application No. EP 17190705.8 filed Sep. 12, 2017, which is hereby incorporated by reference in its entirety as if fully set forth herein.

TECHNICAL FIELD

The invention pertains to the technical field of computer-aided design (CAD), and in particular to building information modeling.

BACKGROUND

A building information model (BIM) is a digital representation of physical and functional characteristics of a facility. A BIM is a shared knowledge resource for information about a facility forming a reliable basis for decisions during its life-cycle; defined as existing from earliest conception to demolition. It can pertain to the planning, designing, constructing, operating and/or maintaining of diverse physical infrastructures in a facility, such as water, refuse, electricity, gas, communication utilities, roads, bridges, ports, tunnels, and the like.

Software products for viewing, creating, and/or editing a BIM often rely on user classification of entities in order to obtain a semantic interpretation of the entities in a facility. However, when importing an unannotated BIM, i.e. without semantic classification of the entities, or a BIM comprising semantic classification in an unintelligible format, there is a need for automated semantic classification of the entities.

Michael Belsky, Rafael Sacks, and Ioannis Brilakis disclose in "Semantic Enrichment for Building Information Modeling", Computer-Aided Civil and Infrastructure Engineering, Volume 31, Issue 4, Pages 261-274 (April 2016), doi: 10.1111/mice.12128, semantic enrichment tools for building information modeling. The document discloses that product data models may require semantic enrichment on the part of the receiving CAD tool and that innovative PLM technologies may infer such relationships from the geometry and spatial topology. The document furthermore discloses that the relative locations of objects to one another are key determinants for their functional classification and for determining their topological and aggregation relationships. The document discloses in particular domain-specific rule sets to identify new facts about building objects and relationships in a building information model.

Domain-specific rule sets require the design and implementation of these rule sets, which may be labor-intensive and costly, and which may require the provision and maintenance of an increasingly complex rule set in order to correctly classify a diverse set of instances of a particular object type.

US 2009/0 319 454 discloses a method for automated classification of 3D CAD models in mechanical engineering, wherein the method provides an algorithm for learning new classifications. The document discloses that classification can rely on different aspects such as topology, local geometry patterns, feature interactions, or gross shape.

US 2013/0 257 850 discloses the extraction of relationship data from BIM data, which may include determining a number of spatial relationships between a number of objects, wherein the spatial relationships are determined from the 3D geometric model.

US 2015/0 006 117 discloses a method for three-dimensional modeling of building roofs using three-dimensional point cloud data. Point cloud data of a roof of a building is received, and roof data points are selected or extracted from the point cloud data. Semantic type classifications are calculated for each selected roof data point. Roof styles are determined from the semantic type classifications, and a synthetic model of the roof and building is rendered based on the determined roof style.

US 2017/0 061 326 discloses a method for improving performance of a trained machine learning model. The method includes adding a second classifier with a second objective function to a first classifier with a first objective function. Rather than minimizing a function of errors for the first classifier, the second object function is used to directly reduce the number errors of the first classifier.

BricsCAD V17 comprises a command BimClassify, which comprises an Auto option to automatically classify an entity based on geometric information of said entity. However, the Auto option of the BimClassify command in BricsCAD V17 cannot correctly classify all entities within all contexts.

There remains a need for a simple, efficient, correct, and automated semantic classification of entities in a BIM.

The present invention aims to resolve at least some of the problems mentioned above.

SUMMARY OF THE INVENTION

In a first aspect, the present invention provides a computer-implemented method (CIM) for the semantic classification of an entity in a building information model (BIM), according to claim 1.

In a second aspect, the present invention provides a computer system for the semantic classification of an entity in a BIM, whereby the computer system is configured for performing the CIM according to the first aspect of the present invention.

In a third aspect, the present invention provides a computer program product (CPP) for the semantic classification of an entity in a BIM, whereby the CPP comprises instructions for performing the CIM according to the first aspect of the present invention. The present invention provides in particular a CPP comprising instructions which, when the CPP is executed by a computer, cause the computer to carry out the CIM according to the first aspect of the present invention. The present invention may provide a tangible non-transitory computer-readable data carrier comprising the CPP.

The present invention is advantageous as it allows for a simple, efficient, correct, and automated semantic classification of entities in a BIM. By taking not only the geometric information but also the relative geometric information into account, a correct context-dependent semantic classification is ensured. By providing a two-step process, in which initially probabilities for candidate semantic classifications for each target entity are determined, followed by the subsequent incorporation of relative geometric information, both steps can be separately devised, implemented, and updated so that a simple, efficient, and easily maintainable semantic classification is ensured. The outlined procedure furthermore provides an automated semantic classification,

DETAILED DESCRIPTION OF THE INVENTION

The present invention concerns a computer-implemented method (CIM), a computer system, and a computer program product (CPP) for the semantic classification of an entity in a building information model (BIM). The invention has been summarized in the corresponding section above. In what follows, the invention is described in detail, preferred embodiments are discussed, and the invention is illustrated by means of examples.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

Term Definitions

"A", "an", and "the" as used herein refer to both singular and plural referents unless the context clearly dictates otherwise. By way of example, "a compartment" refers to one or more than one compartment.

"Comprise", "comprising", and "comprises" and "comprised of" as used herein are synonymous with "include", "including", "includes" or "contain", "containing", "contains" and are inclusive or open-ended terms that specify the presence of what follows (e.g. component) and do not exclude or preclude the presence of additional, non-recited components, features, elements, members, and steps.

"Based on" as used herein is synonymous with "based at least in part on" and is an inclusive or open-ended term that specifies the presence of what follows (e.g. component) and does not exclude or preclude the presence of additional, non-recited components, features, elements, members, and steps.

A "computer-aided design model" (CAD model) as used herein comprises computer-processable data, preferably digital data, about one or more entities, said data representing, or allowing to derive, properties of an entity, such as geometric properties, material properties and/or semantic properties. Said data furthermore represents, or allows to derive, relative geometric properties between multiple entities, such as pairs of entities. A CAD model as used herein is preferably a building information model (BIM).

An "entity", as used herein, is a computer-processable, preferably digital, representation of a modelled element, such as a building element. A non-limiting list of examples of entities comprises a solid, a surface model, and an indirect history-based model. An entity is preferably a solid. "Building element", as used herein, refers to any element which may be represented in a BIM. This may be a constructional element, an architectural element, a mechanical, electrical and plumbing (MEP) engineering element, and the like. A non-limiting list of examples of building elements comprises a bath, a beam, a column, a door, an electric plug, an elevator, a faucet, a lamp, a pipe, a ramp, a roof, a shell, a skylight, a slab, a stair step, a staircase, a toilet, a tube, a wall, a washing sink, and a window. A building element may be represented as a monolithic entity or as an entity comprising multiple components, layers, and the like.

A CAD model may be edited via a corresponding CPP, so-called CAD software. A non-limiting list of examples of CAD software comprises 123D, ACIS, Advance Concrete, Advance Design, Advance Steel, AllyCAD, ArchiCAD, AutoCAD, BricsCAD, BRL-CAD, C3D, Caddie, Cadwork, CATIA, Chief Architect, Cobalt, Creo, DataCAD, DesignSpark Mechanical, Digital Project, Drawing Express, FINE MEP, form•Z, FreeCAD, HiCAD, IDEA Architectural, Inventor, IRONCAD, ItelliCAD, KeyCreator, LibreCAD, MEDUSA, MicroStation, Modelur, NanoCAD, NX, OpenCASCADE, OpenSCAD, Parasolid, PTC Creo, PowerCADD, progeCAD, PunchCAD, QCad, Revit Architecture, Revit MEP, Revit Structure, Rhinoceros 3D, RoutCad, SALOME, ShapeManager, SketchUp, Solid Edge, SolidWorks, SolveSpace, SpaceClaim, SpaceClaim Engineer, Tekla Structures, TopSolid, TransMagic, TurboCAD, VariCAD, VectorWorks, and VisualARQ. This non-limiting list comprises CAD software for drawing two-dimensional building plans as well as software for building information modeling. A non-limiting list of examples of BIM software comprises Allplan, ArchiCAD, ARCHLine.XP, Autodesk Revit, BricsCAD, CodeBook, DDS-CAD, Digital Project, FINE MEP, GRAITEC Advance, IDEA Architectural, MicroStation, Navisworks, OpenStudio, RFEM, Tekla BIMsight, Tekla Structures, Trimble SketchUp, VectorWorks Architect, Vico Office, and VisualARQ. One of ordinary skill in the art will appreciate that while the present invention pertains specifically to a building information model (BIM), it may also be used for CAD models in different fields, such as, for example, mechanical engineering in, for example, automotive, shipbuilding, aerospace, or prosthetics industry.

"Geometric information", as used herein, refers to one or more "geometric properties" of a single entity obtainable or derivable from a BIM. A non-limiting list of examples of geometric properties of an entity comprises a dimension, such as a length, a width, a height, a thickness, a diameter, and the like; a dimensionality of an opening, recess or protrusion; a direction of a principal axis; a largest edge length; a largest face area; a layer thickness; a maximal dimension; a measure of concavity; a measure of convexity; a number of conical faces; a number of cylindrical faces; a number of edges; a number of faces; a number of horizontal faces; a number of layers; a number of openings; a number of planar faces; a number of protrusions; a number of recesses; a number of toroidal faces; a number of vertical faces; a number of vertices; a position; a presence of a component; a presence of an extrusion direction; a radius of curvature; a ratio of a largest edge length to another edge length; a ratio of a largest face area and another face area; a ratio of a volume of the solid and a volume of a bounding box of the solid; a ratio of two maximal dimensions in mutually orthogonal directions; a relative area; a relative dimension; a relative size of the solid with respect to a size of the BIM; a relative vertical location of the solid with respect to a total height of the BIM; a relative volume; a shape; a spline parameter; a volume; an area; an inclination of a largest edge with respect to a reference direction, such as a Z-direction; an inclination of a largest face with respect to a reference direction, such as a Z-direction; an inclination to a reference direction, such as a Z-direction, of a line fitted through a horizontal face of a solid; an inclination, such as with the Z-direction (vertical axis); an orientation; in case of presence of an extrusion direction, a shape of an extrusion profile; and three maximal dimensions in mutually orthogonal directions, such as a height, a length and a width.

As the present invention relates to a computer-implemented invention, obtaining geometric information about an entity of a BIM should be interpreted as obtaining a computer-processable, preferably digital, representation of geometric information about the building element represented by the entity of the BIM, by obtaining or deriving said computer-processable representation of geometric information from the BIM. Said geometric information may be expressed in world units. A dimension, for example, may be interpreted as a computer-processable representation of a dimension in world units.

"Relative geometric information", as used herein, refers to one or more "relative geometric properties" of multiple entities obtainable or derivable from a BIM. Relative geometric properties may be defined in relation to two or more entities, such as two, three, four, five, six, seven or more entities. A relative geometric property preferably relates to a pair of entities, i.e. two entities. A non-limiting list of examples of relative geometric properties of multiple entities comprises a number of sideways connecting entities; a number of touching entities; a position of a contact area; a relative angle, such as a relative angle between faces or axes; a relative distance; a relative orientation; a relative position, such as a relative height; a relative size of a contact area; a relative size, such as a relative dimension, relative area, or relative volume; and a size of a contact area. A relative geometric property is preferably a binary reciprocal proximity property for a pair of entities. Hereby, binary means that the property can be fulfilled or not. Hereby, reciprocal means that a relative order in the entities of the pair is not required in order to specify the property. A relative distance, for example, is a reciprocal property, whereas a relative length, for example, is not a reciprocal property. For example, if entity A comprises a relative distance x to entity B, entity B also comprises a relative distance x to entity A. For example, if entity A comprises a relative length of y (e.g. 50%) with respect to entity B, entity B does NOT comprise a relative length of y with respect to entity A. A non-limiting list of examples of binary reciprocal proximity properties for a pair of entities comprises whether the entities of the pair are within a predefined relative distance; whether the entities of the pair touch or intersect; whether bounding boxes for each entity of the pair touch or intersect; and whether inflated bounding boxes for each entity of the pair touch or intersect.

As the present invention relates to a computer-implemented invention, obtaining relative geometric information about multiple entities of a BIM should be interpreted as obtaining a computer-processable, preferably digital, representation of relative geometric information about the building elements represented by the multiple entities of the BIM, by obtaining or deriving said computer-processable representation of relative geometric information from the BIM. Said relative geometric information may be expressed in world units. A distance, for example, may be interpreted as a computer-processable representation of a distance in world units.

"Semantic classification", as used herein, refers to a function classification of an entity. In particular, "semantic classification", as used herein, may refer to a semantic association of function and/or name to the building element the entity represents, thereby providing meaning to the entity. A non-limiting list of examples of semantic classifications can therefore be found in the non-limiting list of examples of building elements. The Industry Foundation Classes (IFC) data model (ISO 16739:2013) is a particular model for associating semantic classifications with entities, and may, in an embodiment, be used in conjunction with the present computer-implemented invention. As stated before for geometric and relative geometric information, a shorthand description may also be used for semantic classifications: e.g. determining (a computer-processable, preferably digital, representation of) a semantic classification based (at least in part) on the obtained (computer-processable, preferably digital, representation of) relative geometric information and (a computer-processable, preferably digital, representation of) an initial probability distribution. One of ordinary skill in the art will appreciate that such interpretation (e.g. computer-processable, preferably digital, representation) may concern any form of data and data processing contained in this document.

"Artificial intelligence" (AI), as used herein, refers to a field pertaining to machine mimicking of cognitive functions. The central problems of AI research include reasoning, knowledge, planning, learning, natural language processing, perception, and the ability to manipulate objects. Approaches include statistical methods, computational intelligence, and traditional symbolic AI. The AI field draws upon computer science, mathematics, psychology, linguistics, philosophy, neuroscience, artificial psychology, and many others. Capabilities classified as AI include successfully understanding human speech, competing at a high level in strategic game systems, autonomous cars, intelligent routing in content delivery networks, interpreting complex data, and the like. The AI field encompasses the field of machine learning. A non-limiting list of examples of techniques used in machine learning comprises decision tree learning, association rule learning, artificial neural networks, deep learning, inductive logic programming, support vector machines, clustering, Bayesian networks, reinforcement learning, representation learning, similarity and metric learning, sparse dictionary learning, genetic algorithms, rule-based machine learning, and learning classifier systems. A non-limiting list of examples of software programs and/or libraries used for machine learning comprises Apache SINGA, Caffe, Deeplearning4j, Dlib, Keras, Microsoft Cognitive Toolkit, Microsoft Computational Network Toolkit, MXNet, Neural Designer, OpenNN, Pytorch, Scikit-learn for the Python programming language, TensorFlow, Theano, Torch, and Wolfram Mathematica.

Aspects of the Invention

In a first aspect, the present invention provides a CIM for the semantic classification of an entity in a BIM. In a second aspect, the present invention provides a computer system for the semantic classification of an entity in a BIM. The computer system is configured for performing the CIM according to the first aspect of the present invention. In a third aspect, the present invention provides a CPP for the semantic classification of an entity in a BIM. The CPP comprises instructions for performing the CIM according to the first aspect of the present invention. The CPP comprises instructions which, when the CPP is executed by a computer, such as a computer system according to the second aspect of the present invention, cause the computer to carry out the CIM according to the first aspect of the present invention. The present invention may also provide a tangible non-transitory computer-readable data carrier comprising the CPP. The three aspects of the present invention are hence interrelated. Therefore, all features disclosed in this document, above or below, may relate to each of these aspects, even if they have been disclosed in conjunction with a particular aspect.

A target BIM comprises multiple target entities. The CIM comprises several stages for selecting a semantic classification for each target entity:
  obtaining update data;
  obtaining from the target BIM for each target entity geometric information about the target entity;
  determining for each target entity an initial probability distribution of semantic classification based on the obtained geometric information about the target entity;
  obtaining from the target BIM relative geometric information about the target entities;
  determining for each target entity an updated probability distribution of semantic classification based on:
    the obtained relative geometric information about the target entities;
    the initial probability distributions of semantic classification of all target entities; and
    the update data,
  selecting for each target entity a semantic classification based on the updated probability distribution of semantic classification of the target entity.

Herein, a probability distribution of semantic classification comprises for each candidate semantic classification of a set of multiple candidate semantic classifications a numerical probability value.

Initial Probability Distribution

In a preferred embodiment, single entity training data is obtained. For each target entity, the initial probability distribution of semantic classification is then determined based on the obtained geometric information about the target entity and the single entity training data.

Preferably, the single entity training data is loaded from a tangible non-transitory computer-readable storage medium comprising the single entity training data. The computer system may comprise said storage medium. The single entity training data may be derived and stored on the storage medium, after which it may be loaded multiple times for semantic classifications of target entities of multiple target BIMs.

In a preferred embodiment, for each target entity the selected semantic classification is added to the target BIM, and the target BIM comprising said added semantic classifications for the target entities is stored on a tangible non-transitory computer-readable storage medium. The computer system may comprise said storage medium.

The single entity training data may be derived from one or more training BIMs. In a preferred embodiment, a training BIM is obtained. The training BIM comprises training entities and a training semantic classification for each training entity. From the training BIM, training geometric information is obtained about each training entity. The single entity training data is then obtained based on the training geometric information and training semantic classification of each training entity. Multiple training BIMs may be obtained, and the single entity training data may be based on each of said multiple training BIMs. The training semantic classifications of the training entities of the one or more training BIMs may define the set of candidate semantic classifications.

In a preferred embodiment, the single entity training data is obtained based on a training BIM via machine learning.

Preferably, the single entity training data is obtained based on multiple training BIMs via machine learning. The training geometric information and training semantic classification of each training entity may be inputted to a machine learning module. The machine learning module comprises computer-executable instructions for machine learning.

In an embodiment, the machine learning module is based on statistical machine learning. In this embodiment, the machine learning module comprises computer-executable instructions for statistical machine learning and classification. The machine learning module may comprise computer-executable instructions for statistical machine learning and classification based on an artificial neural network, a regression method, or a statistical kernel method. An example of a statistical kernel method is a support vector machine.

In a preferred embodiment, the single entity training data is obtained based on the training BIM via gradient boosting, a particular machine learning technique. The machine learning module may comprise computer-executable instructions for machine learning based on gradient boosting. Friedman (doi: 10.1214/aos/1013203451) and Mason (http://papers.nips.cc/paper/1766-boosting-algorithms-as-gradient-descent.pdf) disclose gradient descent boosting algorithms. A non-limiting list of examples of CPP for machine learning based on gradient boosting comprises xgboost v0.80 and GradientBoostingClassifier from scikit-learn v0.19.2.

In an alternative embodiment, for each target entity, an initial probability distribution of semantic classification may be obtained based on the obtained geometric information about the target entity via a computer-executable set of heuristic rules.

Updated Probability Distribution

Preferably, the update data is loaded from a tangible non-transitory computer-readable storage medium comprising the update data. The computer system may comprise said storage medium. The update data may be derived and stored on the storage medium, after which it may be loaded multiple times for semantic classifications of target entities of multiple target BIMs.

The update data may be derived from one or more training BIMs. In a preferred embodiment, a training BIM is obtained. The training BIM comprises training entities and a training semantic classification for each training entity. From the training BIM, training relative geometric information is obtained about the training entities. The update data is then obtained based on the training relative geometric information and the training semantic classification of each training entity. Multiple training BIMs may be obtained, and the update data may be based on each of said multiple training BIMs.

Figure 3:
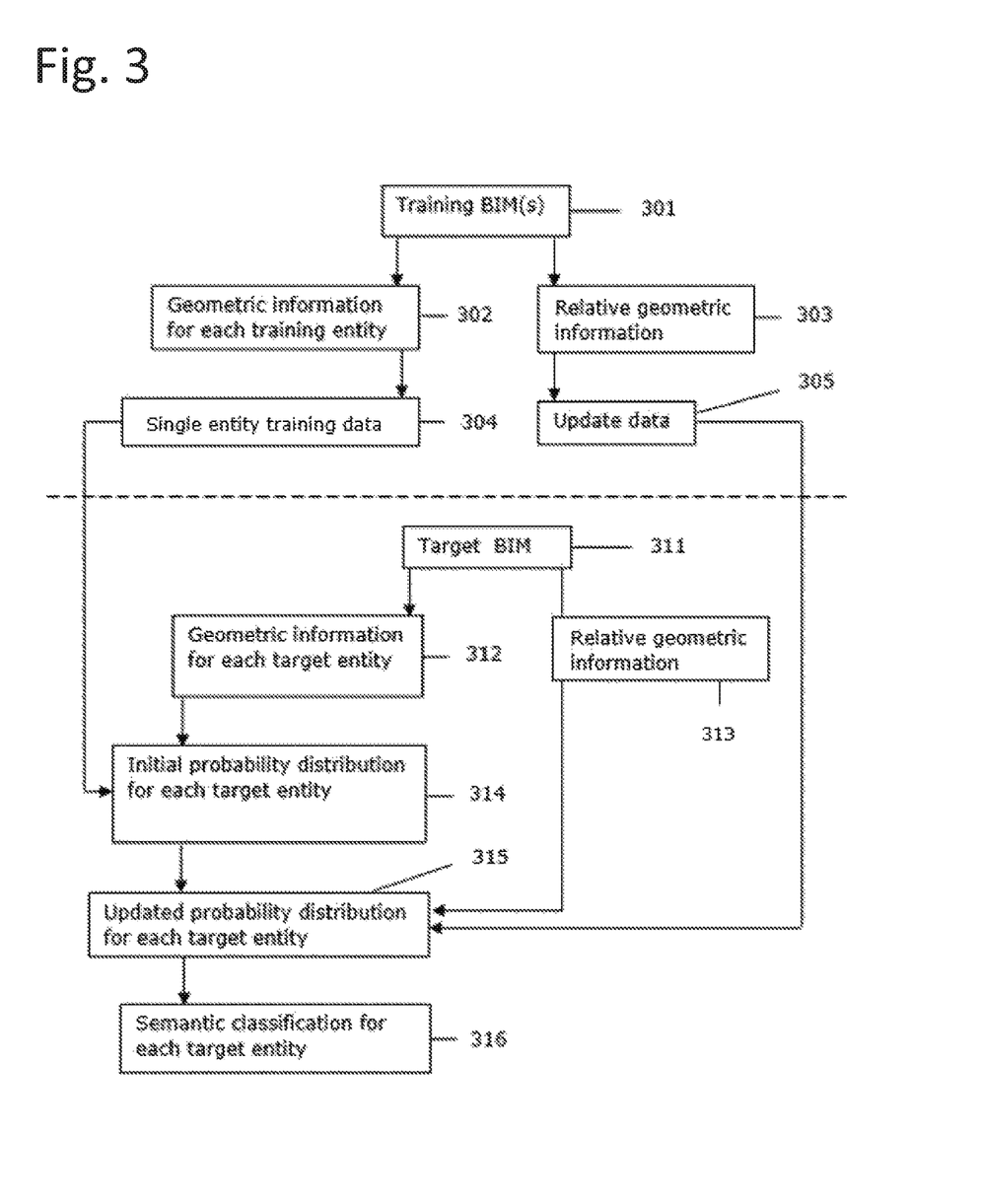
FIGS. 3 and 4 each show a schematic representation of an embodiment of an algorithm according to the present invention.

In FIG. 3, a schematic representation of an exemplary algorithm according to the present invention is shown. From one or more training BIMs (301), single entity training data (304) and update data (305) are obtained. Each training BIM comprises multiple training entities and a training semantic classification for each training entity. From each training BIM (301), training geometric information for each training entity (302) is obtained. The training geometric information (302) and training semantic classification for each training entity are used to obtain the single entity training data (304). From each training BIM (301), training relative geometric information (303) for the training entities of the training BIM is obtained. The training relative geometric information (303) for the target entities and the training semantic classification for each training entity are used to obtain the update data (305). A target BIM (311) comprising multiple target entities is provided. For each target entity, geometric information about the target entity (312) is obtained from the target BIM (311). For each target entity, an initial probability distribution of semantic classification (314) is determined based on the geometric information about the target entity (312) and the single entity training data (304). From the target BIM, relative geometric information (313) about the target entities is obtained. For each target entity, an updated probability distribution (315) is obtained based on the initial probability distributions for all target entities (314), the obtained relative geometric information (313) about the target entities, and the update data (305). For each target entity, a semantic classification is selected (316) based on the updated probability distribution of semantic classification for the target entity.

A relative geometric property is preferably a binary relative geometric property for a pair of entities. In a preferred embodiment, the relative geometric information about entities (training entities, target entities) comprises for a binary relative geometric property an assessment. The assessment comprises for each pair of said entities a fulfilment value of the binary relative geometric property. Preferably, a binary relative geometric property for a pair of entities is a binary reciprocal proximity property for a pair of entities. A non-limiting list of examples of binary reciprocal proximity properties has been disclosed above. Most preferably, a binary reciprocal proximity property for a pair of entities is one of whether the entities of the pair touch or intersect; and whether inflated bounding boxes for each entity of the pair touch or intersect.

An "inflated bounding box" of an entity may be determined by obtaining a bounding box for the entity and by inflating the bounding box. The bounding box may comprise pairwise parallel faces which may or may not be aligned to the global coordinate system of the BIM. A face may be perpendicular to a principal axis of the entity. The faces of the bounding box may be translated outwardly, i.e. the bounding box may be inflated. A face of the bounding max may be translated over a fixed distance. A face of the bounding box may be translated over a distance proportional to a dimension of the original bounding box, in particular proportional to the distance in between the parallel faces of the original bounding box which comprise said face. Most preferably, a face of the bounding box is translated outwardly over the sum of said fixed distance and said proportional distance.

In a preferred embodiment, the update data comprises for the binary relative geometric property a conditional probability table. The conditional probability table comprises for each pair of candidate semantic classifications of the set a conditional probability. The conditional probability is the probability for a pair of entities to comprise said pair of candidate semantic classifications in case of fulfilment of the binary relative geometric property.

In a preferred embodiment, an assessment graph is constructed for the binary relative geometric property. The assessment graph comprises nodes and edges. Each node represents a target entity. Each edge connects a pair of nodes. Each edge represents fulfilment of the binary relative geometric property for the pair of target entities represented by the pair of nodes connected by the edge. The updated probability distribution of semantic classification for each target entity is determined via a Bayesian network technique based on the assessment graph, the initial probability distributions of all target entities, and the conditional probability table of the binary relative geometric property. A non-limiting list of examples of CPP for Bayesian networks comprises Stan (software) v2.18; OpenBUGS v3.2.3; and Just another Gibbs sampler (JAGS) v4.3.0.

In a preferred embodiment, relative geometric information about entities (training entities, target entities) comprises for each of N binary relative geometric properties an assessment, with $N \geq 2$. In this embodiment, the update data comprises for each binary relative geometric property a corresponding conditional probability table. The initial probability distribution is referred to as the 0-th updated probability distribution. An i-th updated probability distribution of semantic classification is determined for each target entity, iteratively, based on the assessment for the i-th binary relative geometric property, the (i−1)-th updated probability distributions of all target entities, and the conditional probability table of the i-th binary relative geometric property, with $1 \leq i \leq N$. For each target entity, a semantic classification is then selected based on the N-th updated probability distribution of the target entity.

Figure 4:
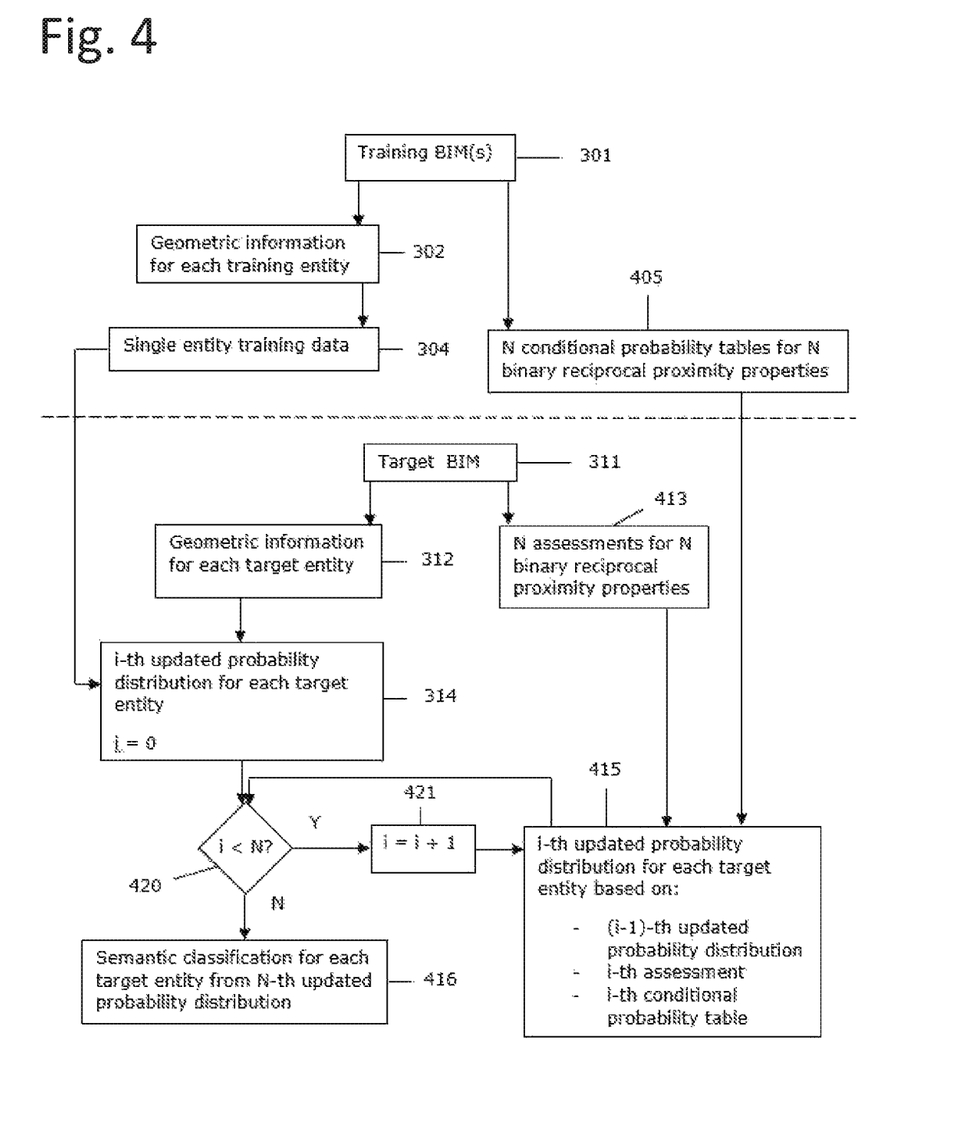

In FIG. 4, a schematic representation of an exemplary algorithm according to the present invention is shown. From one or more training BIMs (301), single entity training data (304) and N conditional probability tables for N binary reciprocal proximity properties (405) are obtained. Each training BIM comprises training entities and a training semantic classification for each training entity. From each training BIM (301), training geometric information for each training entity (302) is obtained. The training geometric information (302) and training semantic classification for each training entity are used to train a gradient boosting algorithm for semantic classification, thereby obtaining the single entity training data (304). For the i-th binary reciprocal proximity property, an i-th conditional probability table is obtained (405) by retrieving for each pair of candidate semantic classifications the number of pairs of training entities fulfilling the binary reciprocal proximity property and comprising said pair of candidate semantic classifications, and subsequently normalizing said retrieved numbers to obtain probabilities. A target BIM (311) comprising multiple target entities is provided. For each target entity, geometric information about the target entity (312) is obtained from the target BIM (311). For each target entity, a 0-th updated probability distribution of semantic classification (314) is determined via the trained gradient boosting algorithm based on the geometric information about the target entity and the single entity training data (304). Iteratively (421), for $1 \leq i \leq N$ (420), for the i-th binary reciprocal proximity property, an i-th assessment is obtained (413) from the target BIM (311). Furthermore, an i-th probability distribution of semantic classification is determined for each target entity (415) based on the (i−1)-th probability distributions of semantic classification of all target entities, the i-th conditional probability table, and the i-th assessment. Thereto, an i-th assessment graph is constructed based on the i-th assessment, as described in the detailed description above, and said i-th updated probability distributions are converged via a Bayesian network algorithm. For each target entity, a semantic classification is then selected (416) based on the N-th updated probability distribution of semantic classification for the target entity.

The invention is further described by the following non-limiting examples which further illustrate the invention, and are not intended to, nor should they be interpreted to, limit the scope of the invention.

EXAMPLES

Example 1: Preferred Algorithm According to the Present Invention

This example describes a preferred algorithm according to the present invention, comprising all the features and steps as disclosed in conjunction with the description of FIG. 4 above.

Multiple training BIMs (301) are provided. Each training BIM comprising multiple training solids (training entities) and a training semantic classification for each training solid. The training semantic classifications of the multiple training BIMs define the set of candidate semantic classifications. The set comprises K candidate semantic classifications with K≥2, and preferably K much larger, such as K>10, K>20, K>50, or K>100.

From each training BIM, for each training solid, training geometric information comprising a plurality of geometric properties about the training solid is obtained (302). The training geometric information (302) and the training semantic classification of each training solid is utilized to train a gradient boosting algorithm, preferably a gradient boosting algorithm of the xgboost library, which generates single solid training data. The machine learning algorithm in conjunction with the single solid training data forms a trained machine learning algorithm configured to output a probability distribution of semantic classification upon providing geometric information of a solid. A probability distribution of semantic classification comprises a vector of K probability values, one for each candidate semantic classification of the set.

The training geometric information about a training solid comprises at least two, preferably at least three, more preferably at least four, even more preferably at least five, yet even more preferably at least six, and most preferably all geometric properties of the list comprising: a number of faces; a number of edges; a number of vertices; a volume; a dimension; a maximal dimension; three maximal dimensions in mutually orthogonal directions, such as a height, a length and a width; a ratio of two maximal dimensions in mutually orthogonal directions; a ratio of a volume of the solid and a volume of a bounding box of the solid; a largest face area; a ratio of a largest face area and another face area; an inclination of a largest face with respect to a reference direction, such as a Z-direction; a largest edge length; a ratio of a largest edge length to another edge length; an inclination of a largest edge with respect to a reference direction, such as a Z-direction; a relative vertical location of the solid with respect to a total height of the BIM; a relative size of the solid with respect to a size of the BIM; a number of planar faces; a number of cylindrical faces; a number of conical faces; a number of toroidal faces; a number of horizontal faces; a number of vertical faces; a presence of an extrusion direction; in case of presence of an extrusion direction, a shape of an extrusion profile; and an inclination to a reference direction, such as a Z-direction, of a line fitted through a horizontal face of a solid.

The training BIMs are furthermore utilized to obtain the update data, based on two binary reciprocal proximity properties for pairs of solids. In the present example, N is hence equal to 2. The first binary reciprocal proximity property for a pair of solids is whether the solids of the pair touch or intersect. The second binary reciprocal proximity property for a pair of solids is whether inflated bounding boxes for each solid of the pair touch or intersect.

A first and a second square matrix of linear size K are obtained, filled with zeroes. For each training BIM and for each pair of training solids of the training BIM fulfilling the first binary reciprocal proximity property, a corresponding entry in the first matrix (e.g. upper triangle of the matrix (including the diagonal), as the property is reciprocal) is incremented with 1. Subsequently, the first matrix is normalized to yield a first conditional probability table (405) comprising probabilities, namely the probabilities for a pair of entries fulfilling the first proximity property to comprise the particular corresponding semantic classifications. For each training BIM and for each pair of training solids of the training BIM fulfilling the second binary reciprocal proximity property, the corresponding entry in the second matrix (e.g. upper triangle of the matrix (including the diagonal), as the property is reciprocal) is incremented with 1. Subsequently, the second matrix is normalized to yield a second conditional probability table (405) comprising probabilities, namely the probabilities for a pair of solids fulfilling the second proximity property to comprise the particular corresponding semantic classifications of the table. The tables may be symmetrized, e.g. by dividing each off-diagonal upper triangular value by two and copying the new value to the corresponding entry in the lower triangle.

A target BIM (311) comprising multiple target entities is provided. For each target entity, geometric information about the target entity (312) is obtained from the target BIM (311), and by inputting the geometric information to the trained machine learning algorithm (304), an initial probability distribution of semantic classification (314) is determined for the target entity.

A first assessment graph is constructed for the target BIM (413) comprising nodes and edges. Each node represents a target solid of the target BIM. Each edge connects two nodes of the first assessment graph and represents that the pair of solids represented by the pair of nodes connected by the edge fulfil the first binary reciprocal proximity property. Based on the initial probability distributions of all target entities (each a vector of K probability values, one for each of the candidate semantic classifications), the first conditional probability table (a symmetric K×K matrix), and the first assessment graph, a first updated probability distribution is converged for each target entity (415) via a Bayesian network algorithm.

A second assessment graph is constructed for the target BIM (413) comprising nodes and edges. Each node represents a target solid of the target BIM. Each edge connects two nodes of the second assessment graph and represents that the pair of solids represented by the pair of nodes connected by the edge fulfil the second binary reciprocal proximity property. Based on the first updated probability distributions of all target entities (each a vector of K probability values, one for each of the candidate semantic classifications), the second conditional probability table (a symmetric K×K matrix), and the second assessment graph, a second updated probability distribution is converged for each target entity (415) via a Bayesian network algorithm.

For each target entity, a semantic classification is then selected based on a maximum probability value in the second updated probability distribution of the target entity (416).

Example 2: Aspect of an Exemplary Algorithm

The present example provides aspects of an exemplary algorithm according to the present invention.

A BIM comprising a plurality of entities is provided. Geometric information about a first entity of the BIM is obtained. A first probability distribution of semantic classification for the first entity is determined based on the obtained geometric information. Relative geometric information about a combination of entities of the BIM is obtained, whereby said combination comprises the first entity. A semantic classification of the first entity is determined based on the obtained relative geometric information and the first probability distribution.

Preferably, the (digital representation of the) determined semantic classification of the first entity is added to the first entity of the BIM. The BIM comprising the first entity comprising the determined semantic classification of the first entity may be stored on a tangible non-transitory computer-readable storage medium. The computer system according to the second aspect may comprise said storage medium on which the BIM is stored. Alternatively or additionally, said storage medium may also be remote from the computer system, such as, for example, a cloud storage system accessible via Internet. This is advantageous as the semantic classification of the first entity may be loaded from the storage medium and reused during subsequent usage of the BIM. A semantic classification may be added to each entity of a group of multiple entities, and all of these added semantic classifications may be stored on the storage medium.

Preferably, the BIM comprises a group of multiple entities. The group may comprise some or all of the entities of the BIM. In this case, geometric information is obtained about each entity of the group. For each entity of the group, a first probability distribution of semantic classification is determined based on the obtained geometric information about the entity. Relative geometric information is obtained about at least one combination of entities of the group. A semantic classification for all entities of the group is then determined based on the obtained relative geometric information about said at least one combination and the first probability distributions for all entities of the group.

Preferably, said determination of the semantic classification for all entities of the group comprises:
  determining based on the obtained relative geometric information about said at least one combination and the first probability distributions for all entities of the group for each entity of the group a second probability distribution; and
  selecting for each entity of the group the most probable semantic classification of the entity according to the second probability distribution of the entity.

The first probability distributions are a priori probability distributions. The second probability distributions are a posteriori probability distributions. The a posteriori probability distributions are obtained from the a priori probability distributions (which are based on geometric information) by taking relative geometric information into account.

This is a bootstrap semantic classification of a group of multiple entities and is advantageous as it further decomposes the semantic classification process in well-organized, clear, and maintainable building blocks. It furthermore comprises a computer-implemented method relating to aspects of the human thought process: "What can the elements be?", "How are the elements relatively positioned?", "Is it likely that such elements are positioned in such a relative position?"

Preferably, a first trainable module based on artificial intelligence is provided as well as a first training set comprising a plurality of entities each comprising a semantic classification. The first module may be trained with geometric information and semantic classifications of at least some of the entities of the first training set, preferably all entities of the first training set. The first probability distribution may then be obtained by providing the obtained geometric information about the first entity to the trained first module. Preferably, the first trainable module is based on machine learning, i.e. the first trainable module comprises computer-executable instructions for machine learning and classification. More preferably, the first trainable module is based on statistical machine learning, i.e. the first trainable module comprises computer-executable instructions for statistical machine learning and classification. Most preferably, the first trainable module comprises computer-executable instructions for statistical machine learning and classification based on an artificial neural network, a regression method, or a statistical kernel method. An example of a statistical kernel method is a support vector machine.

This is advantageous as the training of the first module with the first training set can be performed automated, while implementation of a rule set is labor intensive and costly. The rule set should furthermore be manually updated when entities receive an erroneous semantic classification, while in the present case they should only be added to the first training set. The applicant has moreover found that the training of the first module yields surprisingly accurate results, in spite of using a small first training set and in spite of the limited human labor required.

Preferably, a second trainable module based on artificial intelligence is provided as well as a second training set comprising a plurality of entities each comprising a semantic classification. Preferably, the second training set is the first training set. The second module may be trained with relative geometric information and semantic classifications of multiple entities of the second training set. The semantic classification of the first entity is then determined based on the first probability distribution and the trained second module.

Preferably, said second probability distribution of semantic classification for the first entity is determined based on the output of the trained second module upon inputting the obtained relative geometric information and the first probability distribution. The semantic classification of the first entity is then determined by selecting the most probable semantic classification according to the second probability distribution.

Preferably, the second trainable module is based on machine learning, i.e. the second trainable module comprises computer-executable instructions for machine learning and classification. More preferably, the second trainable module is based on statistical machine learning, i.e. the second trainable module comprises computer-executable instructions for statistical machine learning and classification. The first and the second module may be trained using a different machine learning algorithm. Alternatively, the first and the second module may be trained using the same machine learning algorithm, the only difference being the different input and output. While a distinction is made with respect to the 'first' and the 'second' module, it may hence be the same collection of computer-executable instructions which are used, but with different training data (geometric information; relative geometric information).

This is advantageous for several reasons. A trainable module based on artificial intelligence is preferred over a rule set, for the same reasons at outlined above. Furthermore, since the training of the first and the second module is performed separately, for each of them the most suitable machine learning algorithm may be used. The applicant has also found that the use of two trainable modules yields surprisingly accurate results, in spite of the decoupling of geometric information and relative geometric information as input for the first and the second module, respectively.

Preferably, each of the at least one combination of entities of the group of entities of the BIM is a pair of entities. In this case, each combination comprises two entities of the group. A graph digital representation comprising nodes and edges may be obtained. A node represents an entity of the group. An edge connects a pair of nodes and comprises relative geometric information about the entities represented by the pair of nodes. In this case, a semantic classification for all entities of the group may be determined based on said graph digital representation and the first probability distributions for all entities of the group.

Preferably, at least one training graph digital representation is obtained from the second training set and used to train the second module. The second module is then trained based on said at least one training graph digital representation and the semantic classifications of the entities represented by the nodes of said at least one training graph digital representation.

Preferably, the second trainable module comprises computer-executable instructions for a maximum likelihood estimation, a ridge regression, a Bayesian network method, a Gibbs random field method, or a Markov random field method. The a posteriori (second) probability distributions for the semantic classification of the entities of the group are then determined based on the a priori (first) probability distributions and the graph digital representation, by means of the trained second module. Most preferably, the second trainable module thereto uses a Gibbs or Markov random field method, i.e. the second probability distributions are obtained by inputting the graph digital representation and the first probability distributions to the trained second module, which determines the second probability distributions via a Gibbs or Markov random field method.

The computer system may comprise a tangible transitory computer-readable storage medium (e.g. random access memory (RAM)). The computer system may also comprise a tangible non-transitory computer-readable storage medium (e.g. solid state disk or hard disk drive). The computer system may furthermore comprise a screen and a user input device. The BIM is a digital representation of certain features of a building, which is provided on said transitory and/or non-transitory storage medium. Preferably, said BIM is provided on the non-transitory storage medium. In this case, at least a part of the BIM is loaded from the non-transitory storage medium on the transitory storage medium. The BIM comprises a plurality of entities, whereby an entity is a digital representation of a building element. An entity may be a solid, a surface model, an indirect history-based model, or the like. An entity therefore comprises a digital representation of bounding information which allows to determine for the entity its boundary faces, edges, and vertices, preferably in world coordinates. From this (digital representation of) bounding information (at least part of) said geometric information for a single entity and/or (at least part of) said relative geometric information for multiple entities may be determined.

The number of possible semantic classifications is preferably finite. The first probability distribution based on geometric information of the first entity therefore preferably comprises a finite number of numerical values, each associated with a semantic classification. A digital representation of the first probability distribution may comprise a finite list of values, whereby the position of a value in the list allows to determine the semantic classification to which the value corresponds. A digital representation of the first probability distribution may comprise a collection of multiple combinations of a semantic classification and a corresponding value. This is advantageous as combinations comprising a particularly small value may be discarded from the digital representation for computational efficiency. Moreover, said multiple combinations may be ordered according to decreasing value, i.e. decreasing importance, for computational efficiency. A digital representation of the first probability distribution may comprise the geometric information and a set of data obtained by training the first module. In the latter case, determining a distribution, property, or value based (at least in part) on the first probability distribution should be interpreted as linking output from the first module to another module for determining said distribution, property, or value. This has the advantage that for extremely unlikely classifications when taking the relative geometric information into account, the numerical value according to the first probability distribution should in fact never be explicitly obtained, i.e. it is merely obtainable. Preferably, a finite list comprising for each possible classification a probability value is utilized to represent the first probability distribution.

In all of the above cases, the determination of the first probability distribution of semantic classification for the first entity based on the obtained geometric information about the first entity comprises the step of generating intermediary data on the tangible transitory and/or non-transitory computer-readable storage medium, whereby said intermediary data allows to determine for a possible semantic classification a numerical value associated therewith, whereby the numerical value allows to determine, and preferably is, the probability that said possible semantic classification corresponds to said geometric information. Otherwise formulated: Said generated intermediary data allows to determine for each possible semantic classification a probability. It should be noted that said intermediary data is generated, and therefore present on the tangible transitory and/or non-transitory computer-readable storage medium, before the determination of the semantic classification of the first entity based on the obtained relative geometric information and the first probability distribution.

One of ordinary skill in the art will appreciate that similar considerations (list, collection of combinations, module (functional) linking) may also apply with respect to the second probability distributions.

Preferably, the determined semantic classification of the first entity may be added to the first entity. The BIM comprising the first entity comprising the determined semantic classification may be stored on the tangible non-transitory computer-readable storage medium. Furthermore, the determined semantic classification of the first entity may be shown on a screen of the computing system, optionally upon selection of the first entity and/or a classification display option by means of at least one user input device of the computing system.

Example 3: Exemplary Semantic Classifications of Exemplary BIMs

Training

A first machine learning module, preferably based on gradient boosting, is trained with training geometric information and training semantic classification of each training entity of multiple training BIMs. The first module learns that narrow vertical structures, i.e. with a height (Z-direction) substantially larger than the cross-sectional dimensions, are most probably columns, but could also be walls, chimneys or even other types of building element. The first module further learns that flat (limited height), slim (depth of in between 5 cm and 100 cm), and elongated (length of in between 70 cm and 300 cm) entities may be window sills, stair steps, or even small slabs.

A second machine learning module, preferably based on Bayesian networks, is trained with relative geometric information of training entities and the training semantic classification of each training entity of multiple training BIMs. Said training involves the construction of conditional probability tables for each of multiple binary reciprocal proximity properties. An exemplary conditional probability table is provided in table 1.

TABLE 1

Examplary conditional probability table

|  | wall | column | slab | stair step | ... |
|---|---|---|---|---|---|
| wall | 0.07 | 0.02 | 0.04 | 0.01 | ... |
| column | 0.02 | 0.03 | 0.02 | 0.01 | ... |
| slab | 0.04 | 0.02 | 0.01 | 0.02 | ... |
| stair step | 0.01 | 0.01 | 0.02 | 0.09 | ... |
| ... | ... | ... | ... | ... | ... |

The second module learns that the likelihood of a column touching a wall is smaller than the likelihood of a wall touching another wall. The second module also learns that it is rather unlikely to have window sills in close proximity of each other. On the other hand, the second module learns that it is likely to have stair steps in close proximity.

Column vs. Wall

Figure 1:
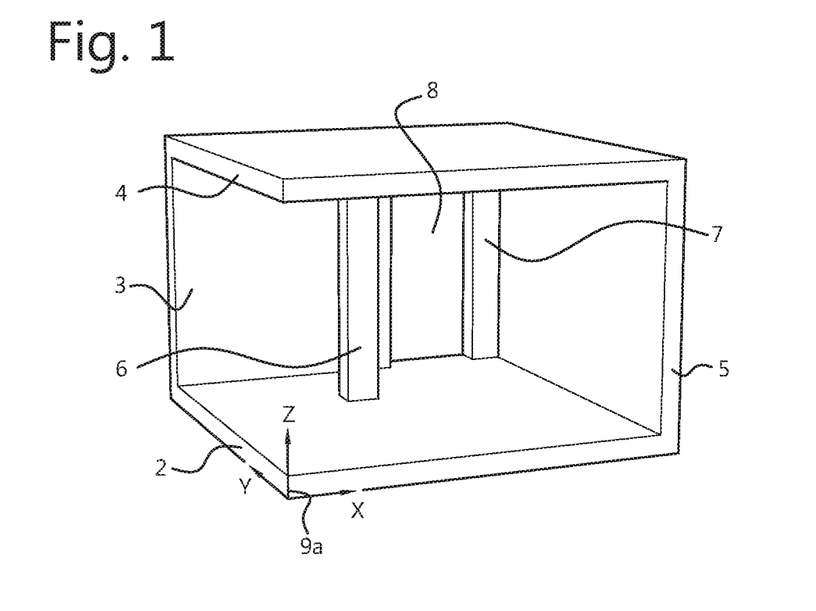
FIGS. 1 and 2 each show a schematic representation of an exemplary BIM for which relative geometric information is important.

FIG. 1 shows a schematic perspective representation of an exemplary target BIM. A coordinate system (9a) defines an origin and axes with respect to which world coordinates can be expressed. The BIM contains a digital representation (an entity) of a floor slab (2), a ceiling slab (4), a first wall (3), a second wall (7), a third wall (5), and a column (6) (building elements). In between the first (3) and second (7) wall a door opening (8) is positioned. When taking geometry by itself into account, it is impossible to distinguish the column (6) and the second wall (7). Relative geometric information (context) is required to do so. The column (6) is solely in contact with the floor slab (2) and the ceiling slab (4). The second wall (7) is in contact with the floor slab (2), the ceiling slab (4), and the third wall (5).

The geometric properties of entities (6) and (7) are identical. For each of entities (6) and (7), an initial probability distribution of semantic classification may be obtained based on the geometric properties via the first module, which may, for example, comprise the following probabilities: [wall: 0.3, column: 0.6, slab: 0.0, stair step: 0.0, ... ]. For these entities, the initial probability distribution may yield that the semantic classifications "column", "chimney", and "wall" have a certain significant nonzero probability, with "column" the highest probability. The initial probability distribution alone is insufficient to correctly classify the entity (7) as a "wall".

Based on relative geometric information, preferably assessments graphs representing binary reciprocal proximity properties between pairs of entities, and the initial probability distributions, updated probability distributions are obtained via the second module. For entity (6), the most probable classification remains "column". However, for entity (7), by Bayesian updating, the probability that it is a "column" is severely lowered since it is rather unlikely that a column is touching a wall. The probability that it is a "wall" on the other hand is raised, since adjacent walls are quite common. "Wall" becomes the most probable classification for entity (7).

Window Sill vs. Stair Step

Figure 2:
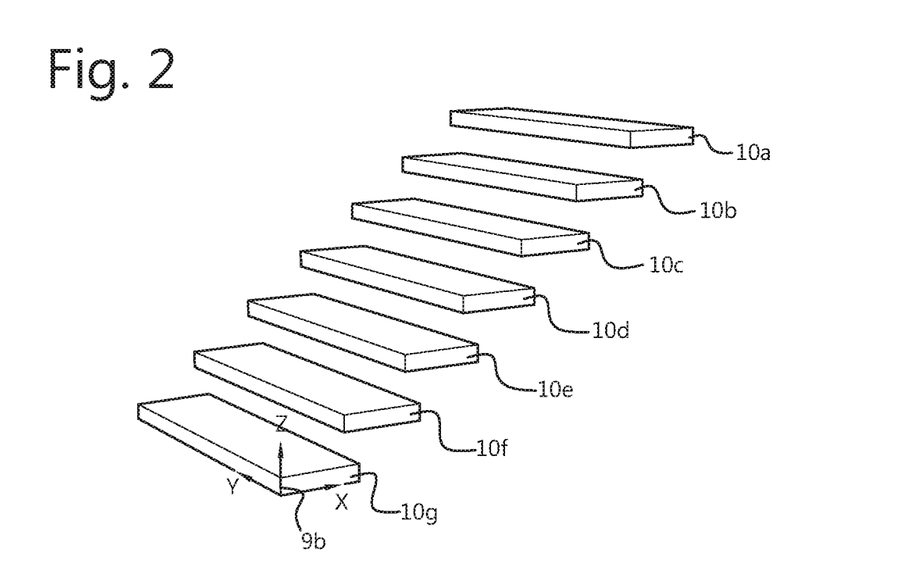

FIG. 2 shows a schematic perspective representation of a BIM. A coordinate system (9b) defines an origin and axes with respect to which world coordinates can be expressed. The BIM contains digital representations (entities) of identical stair steps (10a, 10b, 10c, 10d, 10e, 10f, 10g, 10h).

By combining initial probability distributions and pairwise relative geometric information of the entities, for this example in particular whether inflated bounding boxes for entities touch or intersect, to updated probability distributions, by means of the trained second module, the computer-implemented method correctly determines stair steps as the most probable semantic classifications of the entities (10a) to (10g).

The invention claimed is:

1. Computer-implemented method for a semantic classification of an entity of a building information model, the building information model is a digital representation of physical and functional characteristics of a structure, the building information model comprising data of digital representations of structures of multiple target entities, whereby the method comprises the steps of:

obtaining update data with a computer system;

obtaining from the building information model for each target entity a digital representation of geometric information about the target entity with the computer system, wherein the target entity is a solid;

generating for each target entity an initial probability distribution of the semantic classification with the computer system based on the obtained geometric information about the target entity;

obtaining from the building information model a digital representation of relative geometric information about the multiple target entities with the computer system;

generating for each target entity an updated probability distribution of the semantic classification with the computer system based on the obtained relative geometric information, initial probability distributions of the semantic classification of all target entities, and the update data;

selecting for each target entity a semantic classification with the computer system based on the updated probability distribution of the target entity;

classifying each target entity with the selected semantic classification in an automated semantic classification with the computer system; and updating the digital representation of the building information model with the computer system to include the selected semantic classification for each target entity so as to obtain an updated building information model having each target entity of the structure being semantically classified, the updated building information model being an updated digital representation of the structure with multiple semantically classified target entities, wherein the probability distribution of the semantic classification comprises for each of a set of candidate semantic classifications a numerical probability value.

2. Computer-implemented method according to claim 1, comprising the steps of:

obtaining a training building information model comprising training entities and a training semantic classification for each training entity with the computer system; and obtaining from the training building information model training relative geometric information about the training entities with the computer system, wherein said update data is obtained based on the training relative geometric information and the training semantic classification of each training entity.

3. Computer-implemented method according to claim 1, wherein the relative geometric information about the multiple target entities comprises for a binary relative geometric property an assessment, the assessment comprising for each pair of said entities a fulfillment value of the binary relative geometric property.

4. Computer-implemented method according to claim 3, wherein the update data comprises for the binary relative geometric property a table, the table comprising for each pair of candidate semantic classifications of the set a conditional probability, the conditional probability being the probability for a pair of target entities to comprise said pair of candidate semantic classifications in case of fulfillment of the binary relative geometric property.

5. Computer-implemented method according to claim 4, comprising the steps of:

constructing for the binary relative geometric property a graph with the computer system, the graph comprising nodes and edges, each node representing a target entity, each edge connecting a pair of nodes, each edge representing fulfillment of the binary relative geometric property for the target entities represented by the pair of nodes connected by the edge;

wherein for each target entity the updated probability distribution of the semantic classification is generated via a Bayesian network technique based on the graph, the initial probability distributions of all target entities, and the table of the binary relative geometric property with the computer system.

6. Computer-implemented method according to claim 4, wherein relative geometric information about the multiple target entities comprises for each of N binary relative geometric properties an assessment with N≥2, wherein the update data comprises for each binary relative geometric property a table, wherein an initial probability distribution is a 0-th updated probability distribution, wherein iteratively for each target entity an i-th updated probability distribution of the semantic classification is determined with the computer system based on the assessment for the i-th binary relative geometric property, the (i−1)-th updated probability distributions of all target entities, and the table of the i-th binary relative geometric property, with 1≤i≤N, wherein for each target entity a semantic classification is selected with the computer system based on the N-th updated probability distribution of the target entity.

7. Computer-implemented method according to claim 1, wherein a binary relative geometric property is a binary reciprocal proximity property for a pair of entities, being one of:

whether the entities of the pair of entities touch or intersect; and whether inflated bounding boxes for each entity of the pair of entities touch or intersect.

8. Computer-implemented method according to claim 1, comprising the steps of:

obtaining a training building information model comprising training entities and a training semantic classification for each training entity with the computer system;

obtaining from the training building information model training geometric information about each training entity with the computer system; and obtaining single entity training data based on the training geometric information and training semantic classification of each training entity with the computer system, wherein for each target entity the initial probability distribution of semantic classification is generated with the computer system based on the obtained geometric information about the target entity and the single entity training data.

9. Computer-implemented method according to claim 8, wherein the single entity training data is obtained with the computer system by inputting the geometric information and the semantic classification of each training entity to a machine learning module of the computer system.

10. Computer-implemented method according to claim 9, wherein the machine learning module comprises computer-executable instructions for machine learning based on gradient boosting.

11. Computer-implemented method according to claim 1, wherein the geometric information about the solid comprises at least two geometric properties of the list comprising: a number of faces; a number of edges; a number of vertices; a volume; a dimension; a maximal dimension; three maximal dimensions in mutually orthogonal directions, such as a height, a length and a width; a ratio of two maximal dimensions in mutually orthogonal directions; a ratio of a volume of the solid and a volume of a bounding box of the solid; a largest face area; a ratio of a largest face area and another face area; an inclination of a largest face with respect to a reference direction, such as a Z-direction; a largest edge length; a ratio of a largest edge length to another edge length; an inclination of a largest edge with respect to a reference direction, such as the Z-direction; a relative vertical location of the solid with respect to a total height of the building information model; a relative size of the solid with respect to a size of the building information model; a number of planar faces; a number of cylindrical faces; a number of conical faces; a number of toroidal faces; a number of horizontal faces; a number of vertical faces; a presence of an extrusion direction; in case of presence of an extrusion direction, a shape of an extrusion profile; and an inclination to a reference direction, such as the Z-direction, of a line fitted through a horizontal face of a solid.

12. Computer-implemented method according to claim 1, comprising the steps of:

storing the updated building information model comprising said semantic classifications for the target entities on a tangible non-transitory computer-readable storage medium.

13. Computer system for the semantic classification of an entity of a building information model, whereby the computer system is configured for performing the computer-implemented method according to claim 1.

14. Computer program product for the semantic classification of an entity of a building information model, whereby the computer program product comprises instructions stored on a non-transitory machine readable storage device which, when the computer program product is executed by a computer, cause the computer to carry out the computer-implemented method according to claim 1.

15. Computer-implemented method according to claim 1, comprising:

outputting the initial probability distribution by the computer system; and outputting the updated probability distribution by the computer system.

16. Computer-implemented method according to claim 15, comprising:

outputting the initial probability distribution by the computer system from a machine learning algorithm; and outputting the updated probability distribution by the computer system by a Bayesian network algorithm.

17. Computer-implemented method according to claim 16, comprising:

selecting the semantic classification based on a maximum probability value in the updated probability distribution of the target entity with the computer system.

18. Computer-implemented method according to claim 1, comprising:

loading the selected semantic classification of the target entity with the computer system; and using the selected semantic classification during a subsequent usage of the updated building information model with the computer system.

19. Computer-implemented method according to claim 1, wherein the relative geometric information includes a relative geometric property in relation to two or more of the target entities of the multiple target entities.

* * * * *